(12) United States Patent
Segal (10) Patent No.: US 8,041,621 B2
(45) Date of Patent: Oct. 18, 2011

(54) AUTOMATED TICKET SELLING SYSTEM HAVING A MAXIMUM PRICE SETTING

(75) Inventor: Hillel Segal, Boulder, CO (US)

(73) Assignee: Priceline.com Incorporated, Norwalk, CT (US)

( * ) Notice: Subject to any disclaimer, the term of this patent is extended or adjusted under 35 U.S.C. 154(b) by 1544 days.

(21) Appl. No.: 09/790,059

(22) Filed: Feb. 21, 2001

(65) Prior Publication Data

US 2002/0161689 A1    Oct. 31, 2002

(51) Int. Cl.
*G06Q 40/00*        (2006.01)

(52) U.S. Cl. .......................................... 705/37; 705/26.3

(58) Field of Classification Search .................... 705/27, 705/26, 37, 35, 26.3
See application file for complete search history.

(56) References Cited

U.S. PATENT DOCUMENTS

| | | | | |
|---|---|---|---|---|
| 5,758,328 A * | 5/1998 | Giovannoli | .................. | 705/26.4 |
| 5,765,138 A * | 6/1998 | Aycock et al. | ............... | 705/7.23 |
| 5,845,265 A * | 12/1998 | Woolston | .......................... | 705/37 |
| 5,924,082 A * | 7/1999 | Silverman et al. | .............. | 705/37 |
| 6,085,176 A * | 7/2000 | Woolston | .......................... | 705/37 |
| 6,202,051 B1 * | 3/2001 | Woolston | .......................... | 705/27 |
| 6,266,651 B1 * | 7/2001 | Woolston | .......................... | 705/27 |
| 6,415,264 B1 * | 7/2002 | Walker et al. | ................. | 705/26.3 |
| 7,110,957 B2 * | 9/2006 | Barnard et al. | .............. | 705/7.15 |
| 2001/0027434 A1 * | 10/2001 | Alaia et al. | ........................ | 705/37 |
| 2001/0037285 A1 * | 11/2001 | Alaia et al. | ........................ | 705/37 |
| 2002/0007333 A1 * | 1/2002 | Scolnik et al. | .................. | 705/37 |
| 2002/0046148 A1 * | 4/2002 | Alaia et al. | ........................ | 705/37 |
| 2002/0161689 A1 * | 10/2002 | Segal | .............................. | 705/37 |
| 2004/0039677 A1 * | 2/2004 | Mura et al. | ....................... | 705/37 |
| 2008/0015949 A1 * | 1/2008 | Walker et al. | .................... | 705/26 |

OTHER PUBLICATIONS

Anonymous "Interview: Ian Blakey, chairman of the Energy Intensive Users' Group ( Blakey has seen the customers role in the development of the ESI shift radically )" Jan. 21, 1997, Power UK, N35, p. 19.*

Story, Mark "Win Some Lose Some" Jul. 1999 Management—Auckland, V46N6, pp. 26-33.*

Krause et al. "Supplier development from the minority supplier's perspective " Fall 1999 Journal of Supply Chain Management v35n4 pp. 33-41.*

* cited by examiner

*Primary Examiner* — Kelly Campen
(74) *Attorney, Agent, or Firm* — Walter G. Hanchuk; Chadbourne & Parke LLP (57) ABSTRACT

According to the present invention, a buyer may submit a listing containing a description of an item desired to be purchased, such as an airline ticket, to an operator of an automated selling system. The automated selling system may be a server or series of servers accessible via a computer network, such as the Internet. The listing may contain a maximum price at which the buyer is willing to purchase the item. In the case of an airline ticket, the description accompanying the listing may contain a point of departure, a destination, desired flight times, number of travelers, and/or a specification of acceptable airlines. A plurality of sellers designate listings for which they submit bids to the operator. In the case where the sellers are airlines, the sellers may designate originating and destination city-pairs, a listing of available flights, a floor price for a city-pair, and a range of acceptable prices for one or more bidding rounds. The floor price applicable to a given listing determined from the highest floor price submitted by the eligible sellers for that listing. If only one seller submits a bid, and the bid is less than or equal to the price submitted by the buyer, that seller is selected to make the sale and provide the item. If there are multiple eligible sellers, the sale is awarded to a seller after a predetermined number of rounds of bidding, applying predefined system rules.

50 Claims, 8 Drawing Sheets

| LISTING IDENTIFIER 302 | USER IDENTIFIER 304 | FINANCIAL ACCOUNT IDENTIFIER 306 | ORIGIN CITY 308 | DESTINATION 310 | DEPARTURE DATE 312 | RETURN DATE 314 | NON-STOP 316 | NUMBER OF TRAVELERS 318 | TICKET CLASS 320 | PURCHASE PRICE 322 |
|---|---|---|---|---|---|---|---|---|---|---|
| 99-001 | JOHN WHITE | 41280001101 | NEW YORK, NY | LOS ANGELES, CA | 11/7/2000 | 11/12/2000 | Y | 1 | FIRST | $1000.00 |
| 99-002 | MARY BLUE | 37580400302 | BOSTON, MA | DALLAS, TX | 1/20/2001 | 1/27/2001 | N | 1 | COACH | $225.00 |
| 99-003 | JOSEPH RED | 212056949 | ATLANTA, GA | CHICAGO, IL | 12/18/2000 | 12/22/2000 | N | 2 | COACH | $520.00 |

| SELLER IDENTIFIER 402 | ORIGIN CITY 404 | DESTINATION 406 | TRAVEL DATES 408 | TICKET CLASS 409 | FLOOR PRICE 410 | FIRST ROUND PRICE 412 | SECOND ROUND PRICE 414 | THIRD ROUND PRICE 416 |
|---|---|---|---|---|---|---|---|---|
| AMERICAN | NEW YORK, NY | LOS ANGELES, CA | 1/1/00 - 1/1/01 | COACH | $200.00 | $325.00 | $300.00 | $250.00 |
| UNITED | NEW YORK, NY | LOS ANGELES, CA | 3/15/00 - 12/31/00 | COACH | $240.00 | $300.00 | $275.00 | $260.00 |
| DELTA | NEW YORK, NY | CHICAGO, IL | 12/1/00 - 12/15/00 | COACH | $95.00 | $145.00 | $125.00 | $95.00 |
| NORTWEST | CHICAGO, IL | ATLANTA, GA | 10/25/00 - 4/1/01 | BUSINESS | $450.00 | $995.00 | $895.00 | $795.00 |

AUTOMATED TICKET SELLING SYSTEM HAVING A MAXIMUM PRICE SETTING

FIELD OF THE INVENTION

The present invention relates generally to a system for selling goods and services, such as airline tickets and, more particularly, to a method and system for managing the sale of such goods and services by a seller, such as an airline, to customers who have submitted an offer for the purchase of such items.

BACKGROUND OF THE INVENTION

Airlines and other sellers have developed sophisticated revenue management systems (RMSs) to optimize revenue. Generally, when a flight is first added to an airline's flight schedule, the airline's revenue management system attempts to maximize revenue for the flight by establishing a plurality of fare classes and then allocating the number of seats and price assigned to each fare class. The revenue management system will thereafter continue to monitor the actual demand within each fare class relative to forecasted demand, to dynamically reevaluate the inventory allocation and pricing of each fare class for a given flight. In this manner, the airlines attempt to fly each aircraft as full as possible without allowing earlier-booking discount-fare passengers to displace later-booking full-fare passengers.

While conventional revenue management systems employ sophisticated tools to anticipate future travel, forecasting errors invariably lead to unanticipated excess capacity. In addition, an airline can utilize its revenue management system to forecast its anticipated excess capacity on a given flight associated with seats that are predicted to be empty. Furthermore, unexpected external events, such as a price war or extreme weather conditions, can also affect an airline's excess capacity. Thus, in an attempt to reduce such excess capacity, airlines periodically reevaluate the inventory allocation and pricing of each fare class for a given flight. An airline cannot simply discount the published fares for such unsold seats, however, without either starting a fare war or compromising its own underlying fare structure (i.e., without also reducing its full-fare prices for business travelers).

Although many airlines fill empty seats with "standby" passengers, this practice is typically limited to instances where some oversight on the part of either the passenger or the airline has occurred. For example, the passenger's flight may have been overbooked, the passenger may have missed an original flight, or the passenger may have purchased a ticket at or near the time of the flight. Moreover, standby travel is costly for the airline and is inconvenient for the passenger because there is no guarantee that the passenger will get to fly on the same day.

In addition, airlines attempt to sell excess capacity utilizing consolidators, who traditionally sell airline tickets at a discount. Since the terms of the relationship between the airlines and the consolidators are generally not flight specific and are typically defined months in advance, the sale of tickets through a consolidator does not provide a sufficiently dynamic mechanism for airlines to sell such excess capacity when actual demand fails to meet forecasted demand.

Previous attempts have been made to address the sale of excess capacity for items such as airline tickets. For example, U.S. Pat. No. 5,794,207 entitled "Method And Apparatus For A Cryptographically Assisted Commercial Network System Designed To Facilitate Buyer-Driven Conditional Purchase Offers" provides a system by which buyers may submit a price at which they agree to purchase an item, such as an airline ticket, and to be flexible with regard to the identity of the seller, the travel itinerary, etc. One or more sellers may be notified of the buyer's conditional purchase offer and a seller may accept the conditional purchase offer. A system of this type is available on the Internet at www.priceline.com. Priceline.com uses preferential pricing made available to it by sellers (who remain anonymous until the transaction is complete) to accept conditional purchase offers from buyers. A successful buyer at priceline.com is charged his or her offer price, while priceline.com purchases the ticket from the supplier at the preferential price. Priceline.com keeps the difference between the offer price and the preferred purchase price, and may also charge a fee from the buyer when a sale is completed. The priceline.com system allows sellers to anonymously make discounted sales below published price without disrupting normal sales channels.

Another system that has been available on the Internet at www.travelbids.com allows buyers to post a fare corresponding to a reservation for travel by the buyer, so that travel agents could find a more favorable fare and make the sale. In an alternative embodiment available on the TravelBids site from 1998 to 2000, a buyer could post a "Maximum Price Listing" of the maximum amount the traveler was willing to pay for travel without the need to make a prior reservation. Travel agents, consolidators, or the airlines themselves would then review the listings in a billboard fashion and try to respond with travel arrangements at or below the Maximum Price Listing to obtain the sale. Like priceline.com, the TravelBids site did not allow the buyer to review the details of the transaction, e.g., airline and itinerary, before being bound to make a purchase. However, the buyer could specify that the maximum price they were willing to pay was conditional upon certain factors. These factors might be the number of stops that are acceptable or the hours of acceptable travel, or even the particular airline carriers wanted by the buyer.

SUMMARY OF THE INVENTION

The present application is directed to particular features of an automated ticket selling system having a maximum price setting. In particular, one embodiment includes a method and apparatus for establishing a floor price for a bid for an item. According to this embodiment, a plurality of sellers register to bid for a listing for of an item, such as an airline ticket. Each seller submits an identification of a floor price to be applied to a bid for a listing for the item. In the case of air travel, a separate floor price would be specified for every flight. The floor price for the listing is then determined based on a highest identification of the floor price submitted by one of the plurality of sellers.

According to another embodiment, a method and apparatus for selling an item includes receiving a listing of an item to be purchased and a maximum purchase price to be paid for the item by a buyer. The system identifies one or more sellers that have the ability to sell the item and that have submitted a first indication of a floor price for the item and one or more indications of bids to sell for the item. The first round price may be an absolute currency value or a range of currency values. A floor price for the listing is then determined based on a highest of the received first indications. If one of the first round bid indications is equal to the determined floor price, a sale of the item is awarded to that seller at the floor price. If none of the received first round prices is equal to the floor price then a lowest first round bidder is determined to be the seller submitting the lowest first round price. In a second round of bidding, second round bids from eligible sellers are examined under the system rules. If one of the second round bids submitted is equal to the floor price, then a sale of the item is awarded to that seller at the floor price. However, if none of the second round prices is equal to the floor price, the lowest second round bidder is awarded the sale. Subsequent or fewer rounds of bidding also are contemplated.

According to still further embodiments, a method for bidding on an item begins when a buyer establishes a listing for an item including a purchase price. To be valid, the purchase price must be greater than the floor price established by sellers of the item. If there is a successful bid from a seller, as determined by the system applying pre-defined bidding rules, the buyer receives an identification of a seller providing the item and is charged the purchase price for the item.

According to further embodiments, the buyer may pay a fee to establish a listing. A seller winning a bid for the listing may also pay a fee upon being awarded a sale. Such fees may be used to generate revenue for the operator of the system disclosed herein. Alternatively, or in addition, the system may generate revenue by charging the buyer a price up to the buyer's price, keeping all or part of the difference between the buyer's purchase price and the seller's winning bid.

According to other embodiments, the methods and accompanying apparatus may be implemented on a computer network, such as the World Wide Web.

BRIEF DESCRIPTION OF THE DRAWINGS

Further aspects of the instant invention will be more readily appreciated upon review of the detailed description of the preferred embodiments included below when taken in conjunction with the accompanying drawings, of which.

DETAILED DESCRIPTION OF THE INVENTION

Generally, the present system accomplishes sales of items by allowing a plurality of users to post listings for desired items on a network site, such as an Internet Web Page, through communication between the users' computing devices and a server maintaining the network site. The users supply a description of the desired item and the maximum price they wish to pay for the item. The users supply financial account identifiers and authorizations to charge the desired purchase price if a sale of the item is completed. The users may be required to pay a nominal listing fee to post a listing on the network site.

A plurality of sellers may register to sell one or more items on the site. Each participating seller eligible for a particular sale may submit a floor price and prices for one or more rounds of bidding to secure the sale of an item to a user. These prices are all submitted before a round of bidding for a listed item commences. The submitted prices may be required to be in increments of whole dollars, five dollar increments or the like. The number of rounds of bidding is preset, and sellers may submit up to one bid price per round of bidding. It is also contemplated that bids can be expressed in relative terms, e.g., $5 less than last round winning bid.

The system server, upon receipt of a listing for an item from a user, will determine if any sellers have submitted information sufficient to bid on the listed item. If so, then the floor price submitted by each seller is compared. The highest of the submitted floor prices will be recognized as the standing floor price for the bid. If any seller bids a price equal to or less than the standing floor price at any point during the bidding, then that seller is automatically awarded the bid and will receive the standing floor price for the sale. If more than one seller makes a bid less than or equal to the standing floor price, predefined criteria are used to award the sale to one of them at the standing floor price. The standing floor price is not revealed to any bidding seller. All floor price and bid price indications are confidential and are not revealed to other sellers or the buyer.

The system server will then conduct two or more rounds of bidding. This allows for greater competition among the sellers than a system in which only a single bidding round is provided. A lowest bidder for the first round will be determined and the remaining sellers will then have a second round of prices submitted. The lowest second round bidder will then be determined and the remaining sellers will have an opportunity to have a third round of prices considered. In certain embodiments, the winner of the third round will be awarded the sale corresponding to the listing. However, further rounds (or as few as two rounds) of bidding may be provided for. The lowest final round bidder may be charged a nominal fee for bidding on the sale. It is contemplated that the rounds of bidding will be conducted on a computer system and through an automatic comparison of data. Thus a sale may be determined as soon as a listing is posted. The user posting the listing may then be immediately notified of a sale over the computer network in any conventional manner.

The system for accomplishing a sale of an item disclosed herein may gain revenues from the receipt of a listing fee from the plurality of users and the nominal fee from the completion of the sale. Thus, such a system is not dependent solely on margin revenue from individual sales in order to maintain profitability. The system also may gain further revenues by retaining all or a portion of the difference between the purchase price submitted by the buyer and the price at which the sale was awarded to the lowest final round bidder.

Referring now to FIGS. 1-7B, wherein similar components of the present system are referenced in like manner, various features of an automated ticket selling system having a maximum price setting are disclosed.

Figure 1:
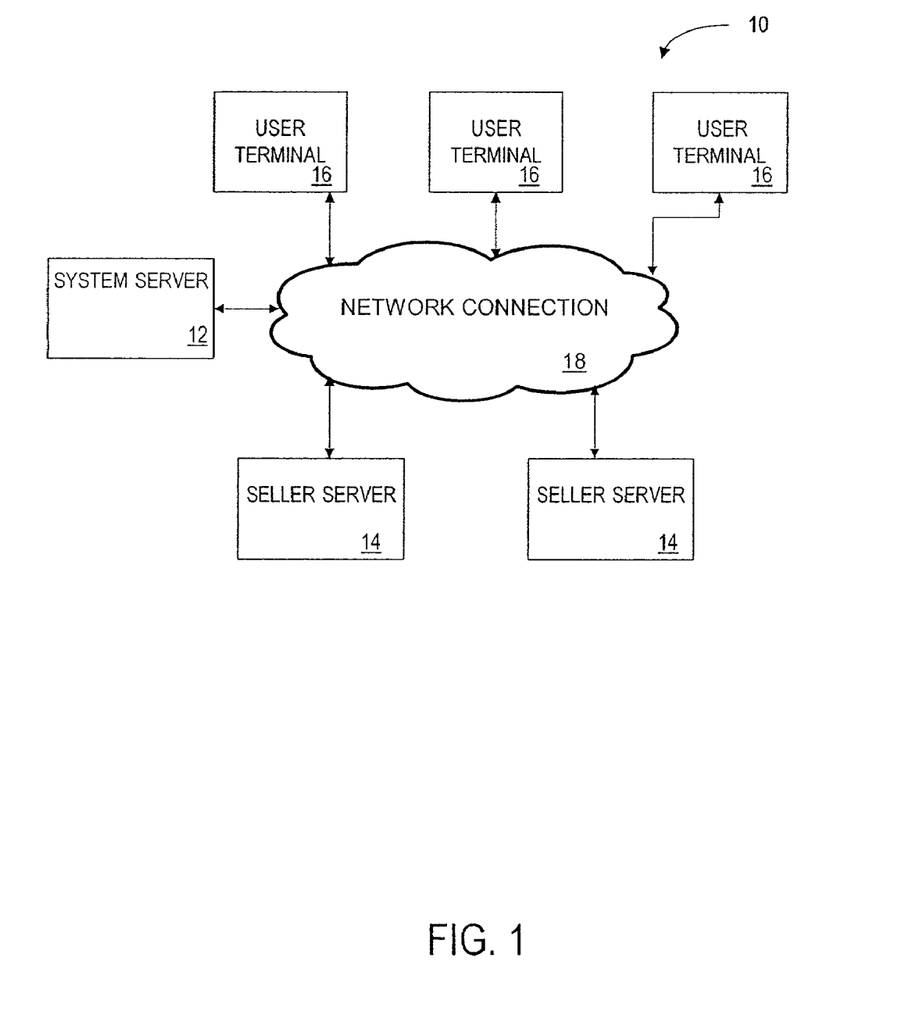
FIG. 1 is a block diagram of a network in accordance with certain embodiments.

Turning now to FIG. 1, there is depicted an exemplary computer network 10 through which a plurality of users operating user terminals 16 may communicate with one or more buyer-driven commerce system servers 12 over network connection 18 to submit purchase offers for bookings identified by a seller through one or more seller servers 14.

Although computer network 10 is preferably an Internet-based network such as the World Wide Web, it may be any one or more of a local area network (LAN), a wide-area network (WAN), an intranet environment, an extranet environment, a wireless network or any other type of computer network, such as those enabled over public switched telephone networks.

User terminals 16 may each be any type of computing device, such as a personal computer, a workstation, a network terminal, a hand-held remote access device, a personal digital assistant (PDA) or any other device that can accomplish two-way electronic communication over the network connection 18. Users may run a web browser or the like on user terminal 16 to communicate with the system server 12, preferably over the Internet. Specific functions and operations of user terminals 16, system server 12, and seller servers 14 are discussed further below.

Figure 2:
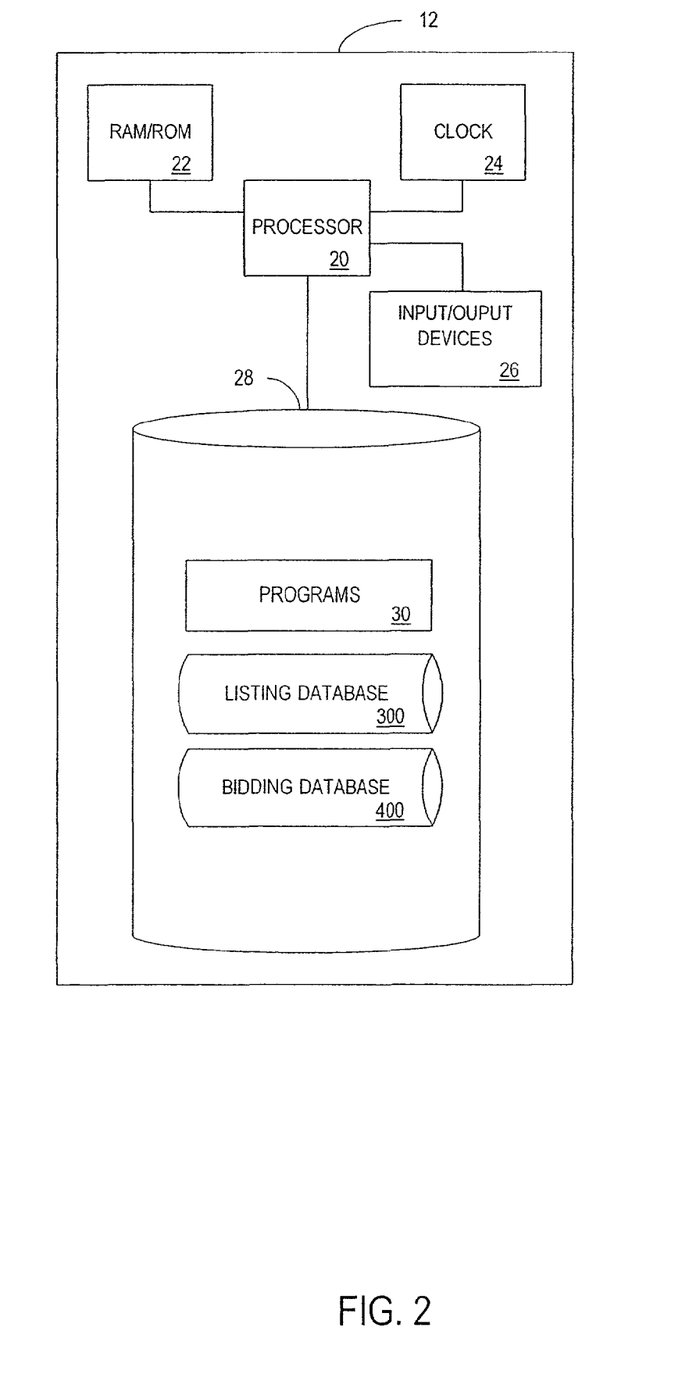
FIG. 2 is a schematic block diagram of a system server used with the network of FIG. 1 in accordance with certain embodiments.

Turning now to FIG. 2, displayed therein are exemplary components of a computing device, such as system server 12. It should be understood that any of user terminals 16, and seller server 14 may share similar configurations. However, for sake of brevity, the discussion immediately below will refer to the system server 12 only.

The primary component of the system server 12 is a processor 20, which may be any commonly available microprocessor, such as the PENTIUM III manufactured by INTEL CORP. The processor 20 may be operatively connected to further exemplary components, such as RAM/ROM 22, a clock 24, input/output devices 26, and a memory 28 which, in turn, stores one or more computer programs 30, a listing database 300, and a bidding database 400.

The processor 20 operates in conjunction with random access memory and read-only memory in a manner well known in the art. The random-access memory (RAM) portion of RAM/ROM 22 may be a suitable number of Single In-line Memory Module (SIMM) chips having a storage capacity (typically measured in kilobytes or megabytes) sufficient to store and transfer, inter alia, processing instructions utilized by the processor 20 which may be received from the application programs 30. The read-only memory (ROM) portion of RAM/ROM 22 may be any permanent, non-rewritable memory medium capable of storing and transferring, inter alia, processing instructions performed by the processor 20 during a start-up routine of the system server 12.

The clock 24 may be an on-board component of the processor 20 which dictates a clock speed (typically measured in MHz) at which the processor 20 performs and synchronizes, inter alia, communication between the internal components of the system server 12.

The input/output device(s) 26 may be one or more commonly known devices used for receiving system operator inputs, network data, and the like and transmitting outputs resulting therefrom. Accordingly, exemplary input devices may include a keyboard, a mouse, a voice recognition unit and the like for receiving system operator inputs. Output devices may include any commonly known devices used to present data to an system operator of the system server 12 or to transmit data over the computer network 10 to remote users 16 and seller server 14. Accordingly, suitable output devices may include a display, a printer and a voice synthesizer connected to a speaker.

Other input/output devices 26 may include a telephonic or network connection device, such as a telephone modem, a cable modem, a T-1, T-2 or T-3 connection, a digital subscriber line or a network card, or the like for communicating data to and from other computer devices over the computer network 10. In an embodiment involving a network server, it is preferred that the communications devices used as input/output devices 30 have capacity to handle high bandwidth traffic in order to accommodate communications with a large number of user terminal 16 and seller servers 14.

The memory 28 may be an internal or external large capacity device for storing computer processing instructions, computer-readable data, and the like. The storage capacity of the memory 28 is typically measured in megabytes or gigabytes. Accordingly, the memory 28 may be one or more of the following: a floppy disk in conjunction with a floppy disk drive, a hard disk drive, a CD-ROM disk and reader/writer, a DVD disk and reader/writer, a ZIP disk and a ZIP drive of the type manufactured by IOMEGA CORP., and/or any other computer readable medium that may be encoded with processing instructions in a read-only or read-write format. Further functions of and available devices for memory 28 will be apparent.

The memory 28 preferably stores, inter alia, a plurality of programs 30 which may be any one or more of an operating system such as WINDOWS 2000 by MICROSOFT CORP, and one or more application programs, such as a web hosting program and a database management program of the type manufactured by ORACLE, each of which may be necessary to implement the embodiments of the present invention. The programs 30 preferably include processing instructions for accomplishing communication of buyer-driven commerce data between user terminals 16, system server 12 and seller server 14, as described herein. Accordingly, the programs 30 may include a web hosting application and the like for allowing users to submit information, such as purchase offers, to the system server 12, to receive information regarding bids that are awarded through the system server 12, and the like. The web hosting software may include functionality sufficient to read JAVASCRIPT, HTML, XML and other similar programming languages typically used in conjunction with hard-wired or wireless Internet applications. The programs 30 preferably also include a database management program, of the type commonly manufactured by ORACLE CORP. to save, retrieve and analyze data received through system server 12. The programs 30 also preferably include other applications, such as VISUAL BASIC, to allow an system operator to program specific functions to be performed by the system server 12 as described herein. The programs 30 operate to form an online commerce system which operates in the manner described below.

Figure 3:
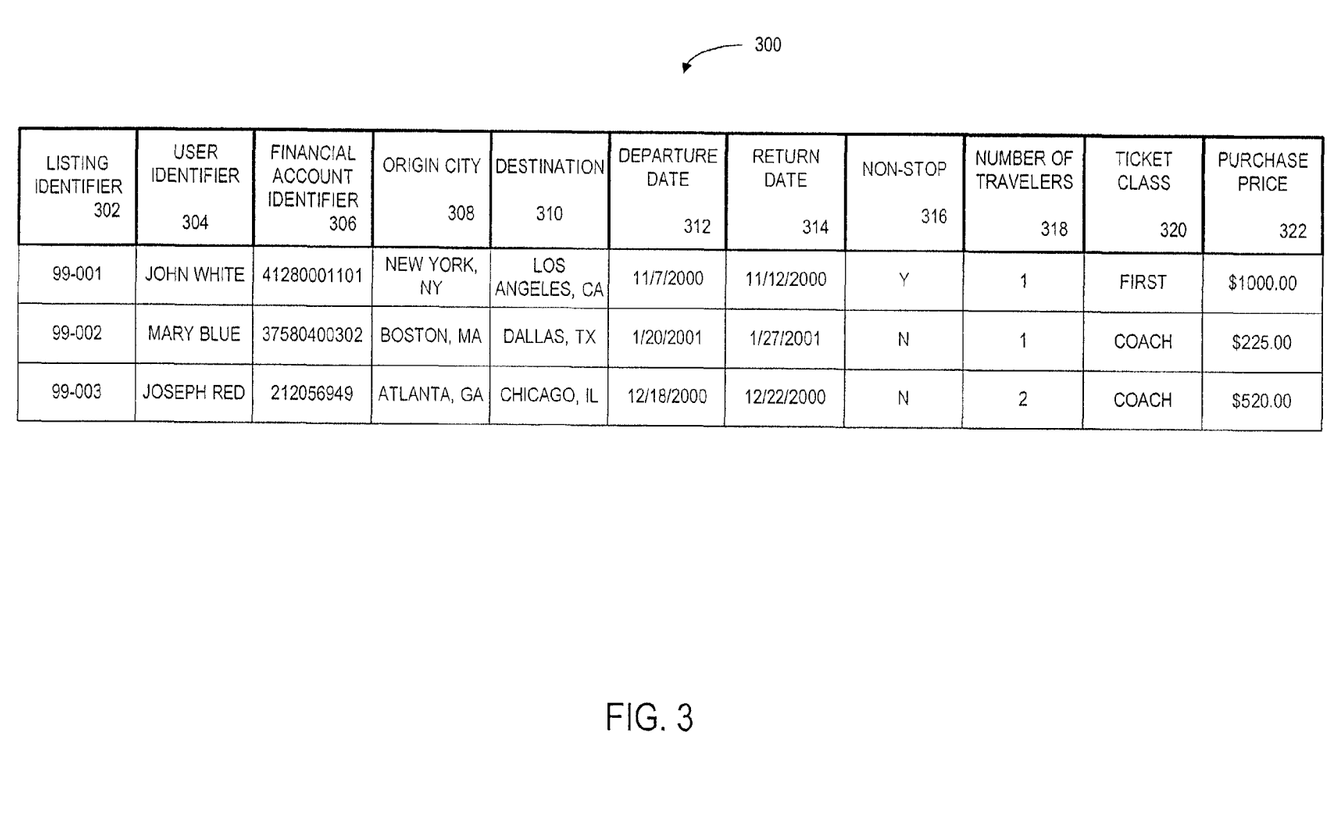
FIG. 3 is a tabular representation of a listing database stored by the system server of FIG. 2 in accordance with certain embodiments.
Figure 4:
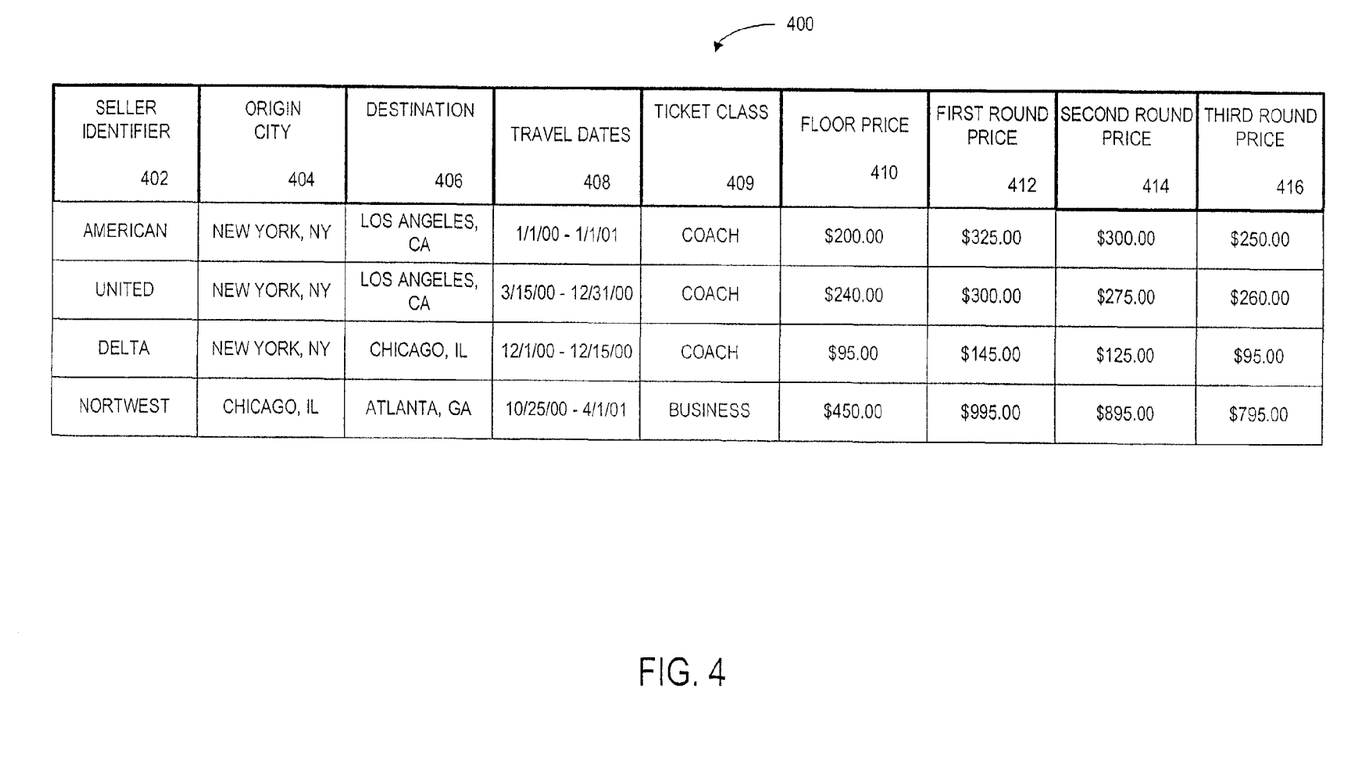
FIG. 4 is a tabular representation of a bidding database stored by the system server of FIG. 2 in accordance with certain embodiments.

The memory 28 preferably also stores a plurality of relational databases, such as a listing database 300 and the bidding database 400, examples of which are depicted in FIGS. 3 and 4, respectively. In referring to the databases depicted therein, it is important to note that the first row of the databases includes a field header for each field of the database and the remaining rows each correspond to one record of the database. Fields of data, are represented by each column. Further or fewer fields and records of data may be used. The databases 300, 400 described herein may be configured into any number of relational databases. In addition, configurations other than database formats may be used to store the data maintained in exemplary databases 300 and 400.

Referring now to FIG. 3, an exemplary listing database 300 is provided to store listings and customer data which are submitted to the system server 12 by the plurality of users through user terminals 16 in accordance with the exemplary process described below with respect to FIG. 6. Although the system described herein may be useful for any item in which a plurality of sellers may bid to achieve a sale to a user posting a listing, the exemplary listing database 300 described herein will be described for an embodiment involving the sale of round-trip airline tickets. In such an embodiment, the exemplary listing database 300 may include a listing identifier field 302, a user identification field 304, a financial account identifier field 306, an origin city field 308, a destination field 310, a departure date field 312, a return date field 314, a non-stop designation field 316, a number of travelers field 318, a ticket class field 320, and a purchase price offered field 322. These fields may be re-arranged, deleted, or altered in any manner to accommodate other products or services.

The listing identifier field 302 may contain a unique identifier pertaining to a particular listing for an item as submitted by a user or potential purchaser who accesses the system 12 to place the listing. The unique identifier may be any alphabetic, numeric or alpha-numeric code which is assigned to the listing. The code may be generated by the system 12 or selected by the user upon accessing the system 12.

The user identifier field 304 may contain a unique identifier pertaining to a user submitting a listing for an item. The unique identifier may be any alphabetic, numeric or alpha-numeric code which is assigned to the listing. The code may be generated by the system 12 or selected by the user upon accessing the system 12. Additional user identification data, such as a user name, a user address, a user telephone number, and other information corresponding to a user may likewise be stored in this field. Alternatively, such data may be stored in a separate user database (not shown) and cross-referenced to the information stored in field 304 of listing database 300 in any known manner.

Financial account identifier field 306 may be used to store an identification of a financial account to be charged in the event of a sale of the listed item to the user. Accordingly, the field 306 may store a credit card number corresponding to a credit card account owned by or available to the user. Other types of accounts, such as a checking or a savings account may be identified. In addition to the account number, other information may be stored in this field 306, such as a name of a bank or other financial institution through which the identified account is maintained.

Fields 308-320 of listing database 300 represent product specific fields which, in the embodiment described, relate particularly to airline tickets. It is to be understood that these fields may be deleted and replaced by appropriate fields when another type of product or service is available for sale through the system server 12. However, in the context of round-trip airline ticket sales, it may be desirable to include some or all of the following exemplary fields.

Origin city field 308 may contain an identification of a city or location from which a corresponding user wishes to depart. Destination field 310 may contain an identification of a city or location to which the corresponding user wishes to travel. Departure date field 312 may contain an indication of a date on which the corresponding user wishes to travel from the specified origin city to the destination. Return date field 314 may contain an indication of a date on which the corresponding user wishes to return to the origin city from the destination. Non-stop field 316 may contain an indication of whether the user wishes to travel non-stop between the origin city and the destination. Number of travelers field 318 may contain an indication of the total number of persons (including the user) travelling between the origin city and the destination on the desired dates. Ticket class field 320 may contain an indication of the class of ticket that the corresponding user wishes to purchase (examples of classes for airline ticket sales generally including first class, business class, coach and economy).

Further data may be collected and stored in additional fields (not shown) of listing database 300, such further data of the type generally associated with the sale of airline tickets. Such further data may include a preferred departure time or time range, a preferred return time or time range, meal specifications, frequent flyer membership identification, an indication of whether one-way or round-trip tickets are preferred, as may be specified by the corresponding user in certain embodiments.

Finally, listing database 300 may contain a purchase price field 322 which may be included for any product or service sold through system server 12. The purchase price field indicates the maximum price at which the corresponding user will purchase the item. This, in turn, is referred to herein as a "maximum price setting" for a listed item.

Turning to FIG. 4, therein is depicted an exemplary bidding database 400 for storing pricing data which is submitted to the system server 12 by the plurality of sellers through seller servers 14 according to the exemplary process described below with respect to FIG. 5. Although the system described herein may be useful for any item in which a plurality of sellers may bid to achieve a sale to a user posting a listing, the exemplary bidding database 400 discussed herein will be described for an embodiment involving the sale of round-trip airline tickets. In such an embodiment, the exemplary bidding database 400 may include a seller identifier field 402, an origin city field 404, a destination field 406, a travel dates field 408, a ticket class field 410, a first round price field 412, a second round price field 414, and a third round price field 416. As with the listing database 300, the fields of bidding database 400 may be re-arranged, deleted, or altered in any manner to accommodate other products or services.

The seller identifier field 402 may contain an identification of a seller who may bid for an item available through system server 12. The seller identifier field 402 may include any identification suitable to identify a particular seller, such as a name of the seller, a location of the seller and the like.

Fields 404-409 of bidding database 400 represent product specific fields which, in the embodiment described, relate particularly to airline tickets. It is to be understood that these fields may be deleted and replaced by appropriate fields when another type of product or service is available for sale through the system server 12. However, in the context of round-trip airline ticket sales, it may be desirable to include some or all of the following exemplary fields.

Origin city field 404 may contain an identification of a city or location from which a user purchasing the airline ticket will depart. Destination field 406 may contain an identification of a city or location to which a user purchasing the airline ticket will travel. Travel dates field 314 may contain an indication of a range of travel dates for which the corresponding pricing data for the sale of an airline ticket (as supplied in fields 410-416) will be applied. Ticket class field 409 may contain an indication of the class of ticket for which the submitted pricing data in fields 410-416 is valid.

Further airline-specific data may be collected and stored in additional fields (not shown) of bidding database 400. Such further data may include a preferred departure time, a preferred return time, meal specifications, a specification of one-way or round-trip tickets and the like, as may be specified by the corresponding seller in certain embodiments.

Further fields of bidding database 400 may include a floor price field 410 for storing a floor price submitted by a corresponding seller for a specified airline ticket, a first round price field 412 for storing a first round price submitted by a corresponding seller for a specified airline ticket, a second round price field 414 for storing a second round price submitted by a corresponding seller for a specified airline ticket and a third round price field 416 for storing a third round price submitted by a corresponding seller for a specified airline ticket. The data in fields 410-416 may be used by the system server 12 to determine a seller that is to be awarded a listing of an item for sale in accordance with the process described below with respect to FIGS. 7A-7B. It is to be understood that fewer or additional bidding rounds may be accommodated in certain embodiments described herein.

Figure 5:
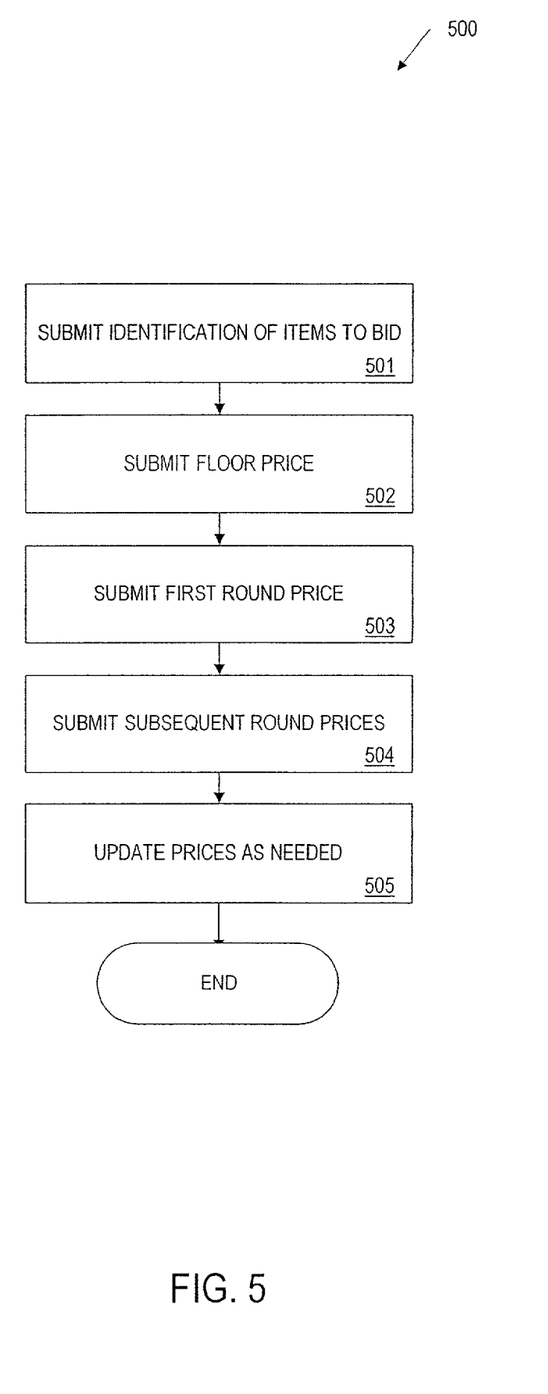
FIG. 5 is a flow chart depicting an exemplary bid price submission process performed by a seller over the network of FIG. 1 according to certain embodiments.

In FIG. 5 there is depicted an exemplary process 500 for submitting bid prices for a listed item, as performed by a seller according to certain embodiments. Process 500 begins when a seller submits an item to be bid (step 501). In the example described herein, the item is a round-trip airline ticket having a particular origin, destination and dates of travel associated therewith.

At step 502, the seller submits a floor price for the item. The floor price is the lowest price at which a seller will agree to sell the item. In a bid for a listed item involving a plurality of sellers, the highest floor price submitted by any of the sellers will be the standing floor price for the bidding process. The highest floor price is selected as the standing floor price to encourage sellers to participate without fear that the system is merely a reverse auction that rewards only the lowest bidder. Sellers typically do not desire to participate in reverse auction systems because such systems, while theoretically efficient, may be perceived as not allowing sellers to make a reasonable profit.

Next, at step 503, the seller submits a first round price to be submitted in a first round of bidding for the sale of the item.

At step 504, the seller submits subsequent round prices based on how many rounds of bidding are to be performed by the system server 12. Each of the prices submitted by a seller should be equal to or greater than that seller's floor price submitted, else the submitted pricing data will be considered invalid.

Finally, at step 505, the seller may update prices as and when necessary, after which the process 500 then ends. For example, the prices submitted for each round may be dependent on a number of items available. In the case of airline tickets, if the number of unsold seats is greater than, say, 25, the airline may decide on a first level of pricing for tickets on this flight. However, if the number of unsold seats is less than, say, 10, the price levels for each round of bidding may be increased due to lower supply. Other economic factors may likewise be used. For example, the updated prices submitted in step 505 may reflect changes in demand for the item, changes in inventory for the item, competition for the sale of the item, and any other factors which affect the pricing of products and services. In certain embodiments, any submitted changes in prices will be applied only to those listings posted by users after the changed pricing is submitted by the seller. The pricing submitted in steps 501-505 may be stored in appropriate fields of the bidding database 400. The pricing may then be applied to the bidding process discussed below in conjunction with FIGS. 7A-7B.

Figure 6:
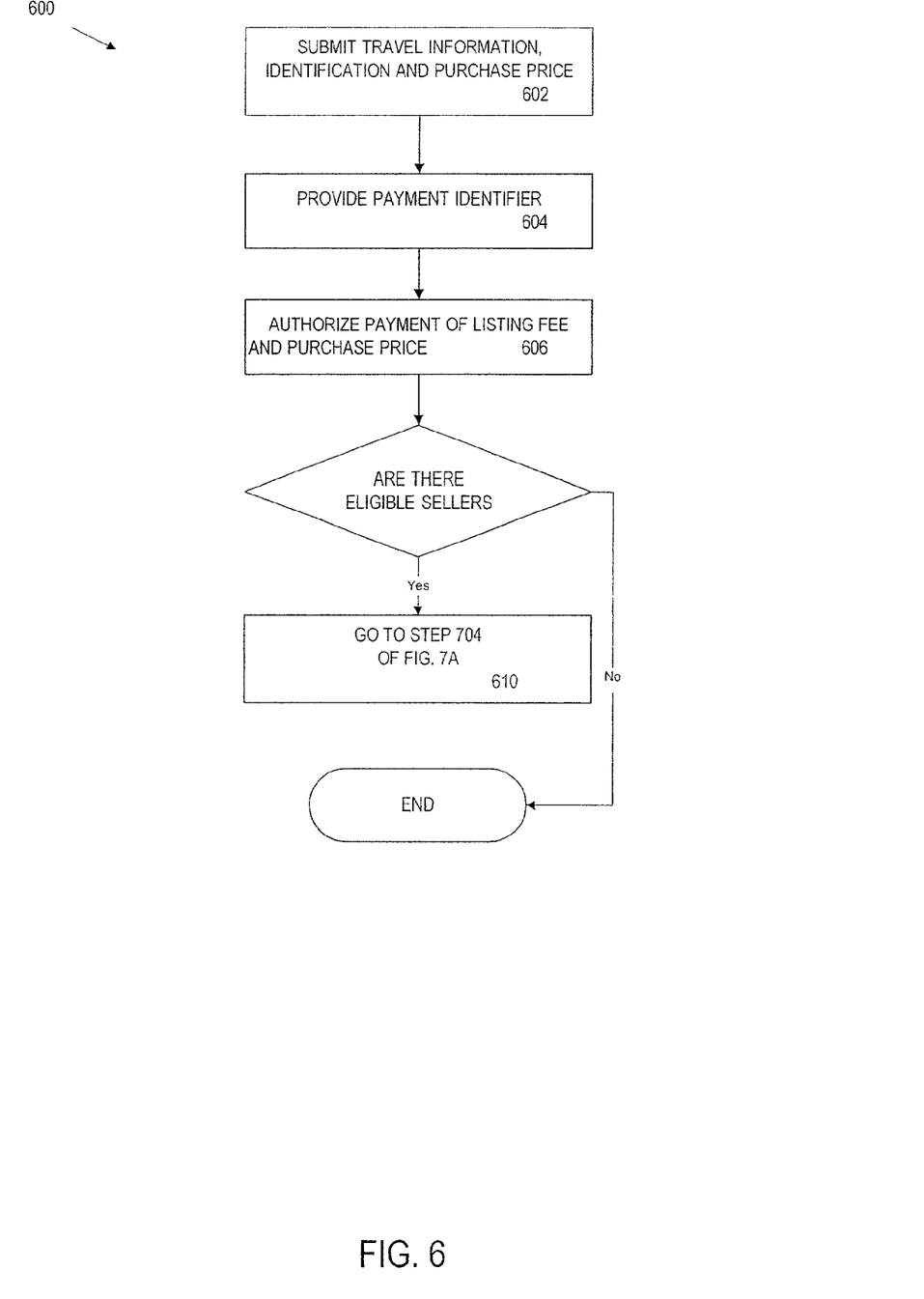
FIG. 6 is a flow chart depicting an exemplary process, performed by a buyer, for submitting a listing over the network of FIG. 1 according to certain embodiments.

Referring now to FIG. 6, there is depicted an exemplary process 600, as performed by a buyer, for submitting a listing according to certain embodiments. The process 600 begins at step 602 where a user submits travel information (e.g., an origin city, a destination, travel dates, number of passengers, ticket class, acceptable or unacceptable sellers and the like), identification information (e.g., a user identifier, a user name, contact information and the like) and a purchase price for a desired item. This data may be stored in the appropriate fields of the listing database 300.

Next, at step 604, the user may provide a payment identifier corresponding to a financial account from which the purchase price for the item is to be paid. The financial account may be a credit card account, a debit account, a bank account such as a checking account and the like. This data may be stored, for example, in financial account identifier field 306 of listing database 300. In a preferred embodiment the buyer agrees to purchase the item and gives permission to charge the payment identifier for the sale if the sale can be completed at or below the price specified by the buyer, plus applicable fees, taxes, surcharges, etc., if any.

It is contemplated that the user may be charged a listing fee to post a listing through the system server 12. The listing may be a nominal fee (e.g. $5.00). In the alternative, the listing fee may be charged only after a sale of the desired item to the user is completed. Accordingly, at step 606, the user may authorize the charge to the identified financial account at any time. The user may also provide conditional authorization for the charge of the purchase price if a seller is identified. In a preferred embodiment, the buyer submits information over the Internet by using an Internet browser to fill out electronic forms through a web site maintained and operated by the system operator. Alternative methods of submitting information, such as by telephone, wireless web, etc. also are contemplated.

Figure 7A:
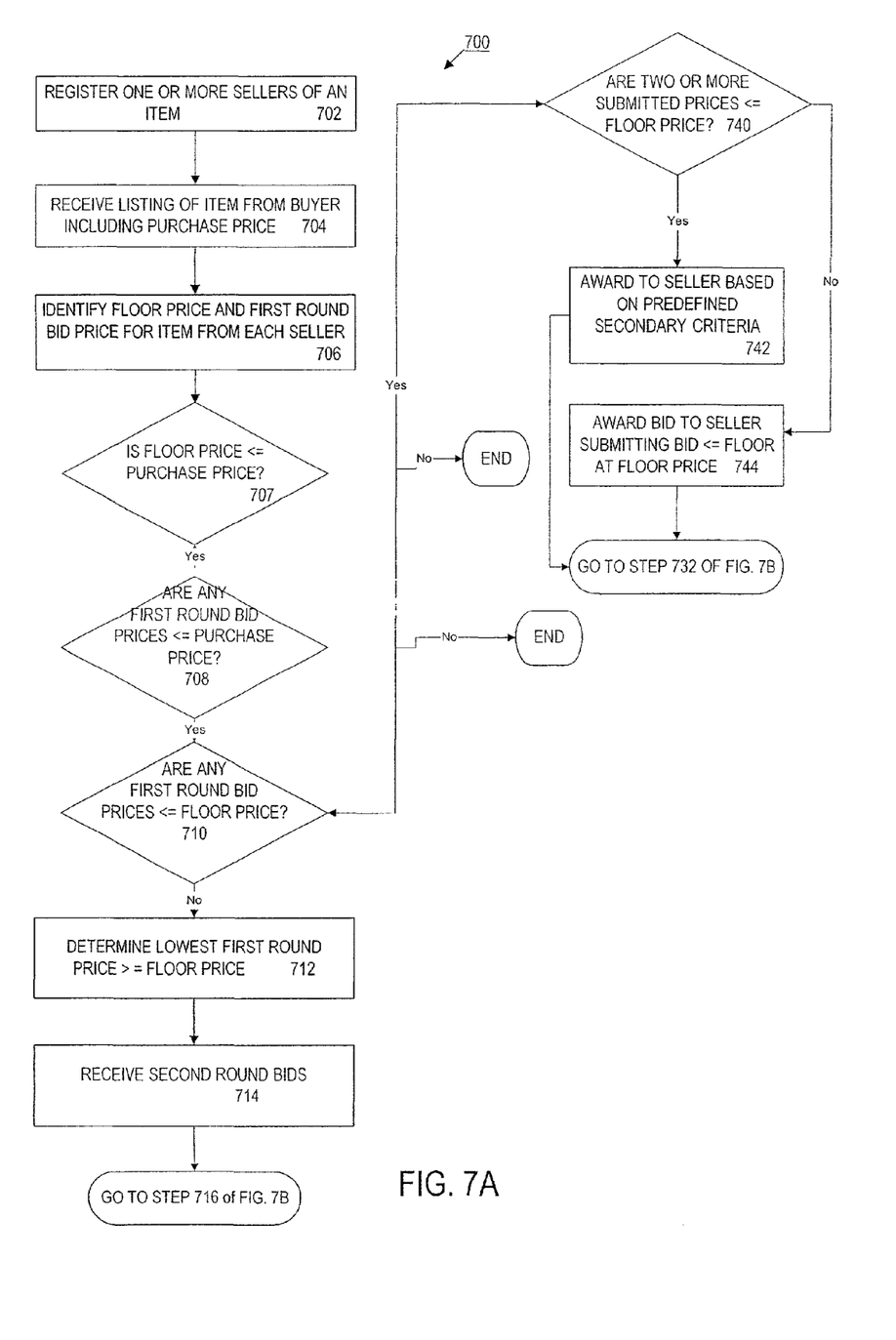
FIGS. 7A-7B are a flow chart depicting an exemplary process for determining an award of a bid as determined by an operator of the system server of FIG. 2 according to certain embodiments.
Figure 7B:
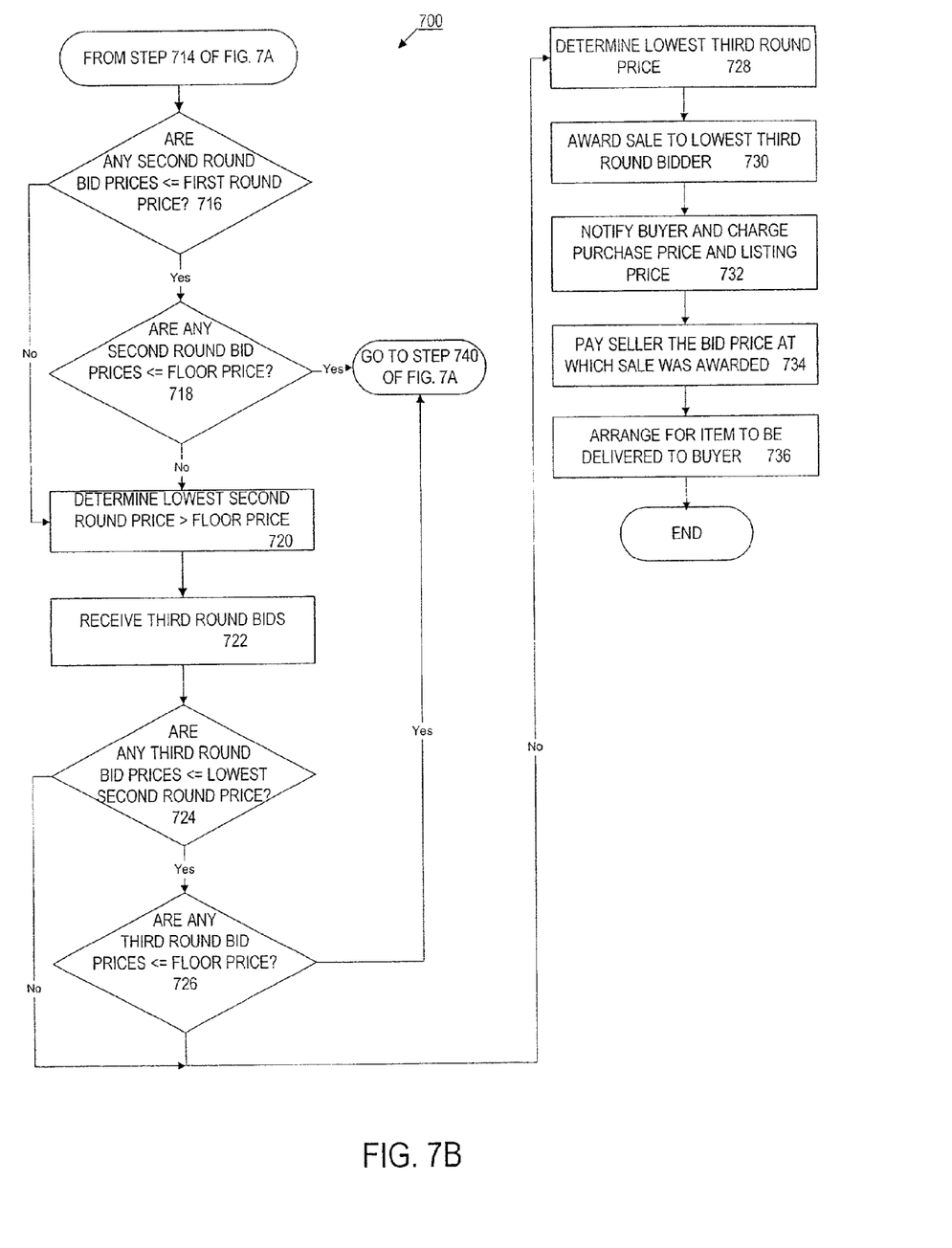

After all the above-identified information has been received, the system server 12 will review submitted pricing data from the sellers to determine an award of the listing to a particular seller in accordance with the bid determination process of FIGS. 7A-7B. It is contemplated that the determination of a seller may be performed automatically upon completion of a listing by the user. Thus, a user may be promptly notified of the sale via the network connection 18 upon submission of the listing information. Alternatively, such notification may take place via an electronic mail (e-mail) message, an instant message or in any other available manner, such as off-line, for example, by written notification sent via first class mail or via a telephone or voice-mail message. In alternate embodiments, the notification may be delayed where the bid determination process or the notification is not performed over the network 10.

If a potential seller has been identified, the process 600 continues to step 704 of FIG. 7A. Otherwise the process 600 ends and the user is notified that no sale has been completed.

Referring to FIGS. 7A and 7B, therein are depicted exemplary processes 700 for determining an award of a bid for a listed item as performed by the system server 12. The process 700 begins at step 702 wherein one or more sellers register with the system server 12 to sell a particular item, such as an airline ticket good for travel between an origin city and a destination during predetermined dates. The registration may include the submission of floor prices and prices for one or more rounds of bidding for the item. A user may then post a listing corresponding to the item (step 704), including a purchase price for the item.

The pricing data submitted by the sellers for the item are then identified by the system server 12 (step 706) from data stored in the bidding database 400. As stated previously, a standing floor price for the bid process is determined from the highest floor price submitted by any of the plurality of sellers. At step 707, the system determines whether the floor price is less than or equal to the buyer's purchase price. If not, the process ends and the user is notified that no sale of the item will be completed. If the floor price is less than or equal to the buyer's price the system proceeds to step 708.

At step 708, the identified data is analyzed to determine whether any of the submitted first round bid prices are less than or equal to the purchase price submitted by the user. If none of the first round prices are less than or equal to the purchase price, the process 700 ends and the user is notified that no sale of the item will be completed. If one or more of the submitted first round prices are less than or equal to the purchase price, the process 700 continues to step 710 below.

At step 710, the system server 12 determines whether any of the submitted first round prices are less than or equal to the standing floor price. If so, the process 700 continues to step 740, discussed further below. Otherwise, the process 700 continues to step 712.

At step 712, a lowest first round bidder is determined. The lowest first round bidder is that seller who submitted the lowest first round price greater than the standing floor prices.

Next, at step 714, for sellers other than the lowest first round bidder the system retrieves second round bids. The lowest first round bidder retains the first round price for the next round of bidding. The process 700 then continues to step 716, as depicted in FIG. 7B.

At step 716, the system server 12 determines whether any of the second round bids are less than or equal to the lowest first round bid. If so, the process continues to step 718 below. Otherwise, the process continues to step 720, discussed further below.

At step 718, the system server 12 determines whether any received second round prices are less than or equal to the standing floor price. If so, the process 700 continues to step 740, discussed further below. Otherwise, the process continues to step 720.

At step 720, the system server 12 determines a lowest second round bidder. The lowest second round bidder corresponds to that seller submitting the lowest price in the second round. In certain iterations of the process 700, it may be that the lowest second round bidder corresponds to the lowest first round bidder when no lower bids were submitted in the second round.

Next, at step 722, for sellers other than the lowest second round bidder the system retrieves third rounds bids. The seller with the lowest second round bid retains that bid for the third round of bidding.

At step 724, the system server 12 determines whether any of the third round bids are less than or equal to the lowest second round bid. If so, the process continues to step 726 below. Otherwise, the process continues to step 728, discussed further below At step 726, the system server 12 determines whether any received third round prices are less than or equal to the standing floor price. If so, the process 700 continues to step 740, discussed further below. Otherwise, the process continues to step 728.

At step 728, the system server 12 determines the lowest third round bidder. The lowest third round bidder corresponds to that seller submitting the lowest price in the third round. In certain iterations of the process 700, it may be that the lowest third round bidder corresponds to the lowest second round bidder when no lower bids were submitted in the third round.

At step 730, the sale is awarded to the lowest third round bidder. The user is then notified of the sale and the purchase price and listing price are charged to the financial account identified by the user (step 732). The seller who was awarded the listing is then paid the amount corresponding to the lowest third round bid (step 734). Then, at step 736, the item is delivered to the user in any conventional manner. In the case of airline tickets, the delivery may include a confirmation of an airline e-ticket, a mail delivery of a paper-based airline ticket or any other conventional method for delivering an airline ticket to a user. After step 736, the process ends.

As described previously, it is contemplated that a bidder submitting a price less than or equal to the standing floor price will be automatically awarded the sale of the listed item. Thus, with process 700, if it is determined in any round of bidding that one or more sellers has submitted a price less than or equal to the standing floor price, the process 700 will continue to step 740.

At step 740, the system server 12 will determine if two or more sellers has submitted a price less than or equal to the floor price. If at least two sellers have done so, the process continues to step 742, wherein one of the sellers will be awarded the sale at the standing floor price based on a pre-defined criteria. For example, the sale may be awarded to the seller that submitted the lowest bid. Alternatively, the sale may be awarded randomly to one of the sellers, on a rotation basis to eligible sellers, to the seller with the highest market share, or the highest market share in the origin city or destination city. Other such secondary factors may be used for this determination.

If, on the other hand, only one seller has submitted a bid price less than or equal to the floor price, the process 700 continues from step 740 to step 744 wherein the listing is awarded to that seller. From either step 742 or step 744, the process 700 continues in the manner described above from step 732.

In describing process 700, it should be noted that multiple bidding rounds allow for more competition between sellers than having just a single round. The multiple rounds of bidding allow a seller, no matter how large or small, to strategically select pricing for subsequent rounds of bidding in order to capture sales of an item. Accordingly, two or more rounds of bidding may be provided for during process 700. Furthermore, by automatically awarding the bid to the seller matching or beating the floor price, smaller competitors may aggressively increase sales in direct competition with sellers having a larger market share. The provision of a standing floor price also encourages participation, particularly by the seller with the greatest market share, by assuring that the system does not unduly reward an aggressive price cutter seeking to gain market share.

EXAMPLES

The following examples are provided to illustrate potential embodiments of the invention. They are intended to be illustrative of the invention and should not be construed as limiting the scope of the invention.

The process of these examples is dependent upon certain pre-defined rules that the system is programmed to follow. The sellers are aware of these rules and base their bids accordingly. It is the interplay of these rules and the sellers' bids that allow the automated system to award the winner in each case. Rules:

1. The bidding participants for any particular listing are only those sellers who have entered predefined data for the listed item.
2. The floor price for the listed item is determined to be the highest of all the floor prices set by the individual sellers for that item. (This allows any participant to prevent what it may define as predatory pricing for the item.) For purposes of the examples, the floor price must be at least 25% lower than the seller's lowest published price for that item.
3. The system will only bid as low a necessary, in $5 increments, in dollar amounts divisible by 5 (i.e. $100, $105, $110, etc.)
4. The system will not automatically generate a bid for a seller in a subsequent round that beats the same seller's bid in a proceeding round.
5. Each seller has a maximum of two bids for any item.
6. Whenever there is more than one bid for an item, bidding "the floor" is defined as the lowest bid. Thus, bidding "$5 less than the lowest bid" is defined as higher than the floor.
7. Whenever there is more than one bid for an item, bidding a specific amount is considered lower than "$5 less," even if the result of both is the same dollar value.
8. In the case where more than one seller bids the identical amount during any round of bidding, their bids in subsequent rounds are examined and the winner in the current round is determined to be the one with the lowest bid in the subsequent rounds.
9. If the lowest bids in the subsequent rounds or the final round are identical, tie breaking rules are used to award the listing.

In all the following examples, it is assumed that the all sellers are bidding on the same item, and that they all have identical products to offer. In reality, however, less than all the sellers may qualify under the conditions set by the buyer, e.g., the buyer may have excluded one or more sellers from consideration or picked flight times or number of stops that exclude certain sellers.

Example #1

Just One Bidding Seller

Maximum Price Listing of $150

|          | Floor | $1^{st}$ Round | $2^{nd}$ Round | $3^{rd}$ Round |
|----------|-------|----------------|----------------|----------------|
| Seller A | $100  | $200           | $130           | Floor          |

Process:
1. The system determines that floor price is at least 25% lower than the lowest published fare for that day and sets the floor price at $100
2. $1^{st}$ Round: since the only bid is above the Maximum Price offered by the buyer, the $1^{st}$ Round bid is disregarded
3. $2^{nd}$ Round: since Seller A's bid is below the Maximum Price offered by the buyer, Seller A is awarded the listing at $150. Even though Seller A was willing to go as low as $130, since there were no other bidders, this was not necessary.

Example #2

Two Bidders, Simple Case

Maximum Price Listing of $150

|          | Floor | $1^{st}$ Round | $2^{nd}$ Round | $3^{rd}$ Round |
|----------|-------|----------------|----------------|----------------|
| Seller A | $100  | $200           | $150           | $5 less        |
| Seller B | $130  | $190           | $140           | Floor          |

Process:
1. The system determines that floor price is at least 25% lower than the lowest published fare for that day and sets the floor price at $130
2. $1^{st}$ Round: since all bids are above the Maximum Price offered by the buyer, all $1^{st}$ Round bids are disregarded
3. $2^{nd}$ Round: Seller B is the winner of this round and uses up one of its two allowed bids. Since at least one of the sellers has an additional bid remaining (in this case they both do), it goes to the next round
4. $3^{rd}$ Round: The system converts Seller A's $5 less bid to $5 less than the last round winning bidder, which makes Seller A's bid $135. Since Seller B's bid is the floor, which was previously defined as $130, Seller B is awarded the listing.

Example #3

Two Bidders, Rule Prevents One Seller From Beating its Own Prior Bid

Maximum Price Listing of $150

|          | Floor | $1^{st}$ Round | $2^{nd}$ Round | $3^{rd}$ Round |
|----------|-------|----------------|----------------|----------------|
| Seller A | $100  | $200           | $140           | $5 less        |
| Seller B | $130  | $190           | $150           | Floor          |

Process:
1. The system determines that floor price is at least 25% lower than the lowest published fare for that day and sets the floor price at $130
2. $1^{st}$ Round: since all bids are above the Maximum Price offered by the buyer, all $1^{st}$ Round bids are disregarded
3. $2^{nd}$ Round: Seller A is the winner of this round and uses up one of its two allowed bids. Since at least one of the sellers has an additional bid remaining (in this case they both do), it goes to the next round
4. $3^{rd}$ Round: The system converts Seller A's $5 less bid to $5 less than the last round winning bidder, which makes Seller A's bid $135. However, this is not counted since Seller A was the winning bidder in the proceeding round. Since Seller B's bid is the floor, which was previously defined as $130, Seller B is awarded the listing.

Example #4

Three Bidders With Examination of Subsequent Bid to Determine Winner

Maximum Price Listing of $150

|          | Floor | $1^{st}$ Round | $2^{nd}$ Round | $3^{rd}$ Round |
|----------|-------|----------------|----------------|----------------|
| Seller A | $100  | $200           | $130           | Floor          |
| Seller B | $130  | $190           | $125           | $5 less        |
| Seller C | $125  | $185           | $130           | $5 less        |

Process:
1. The system determines that floor price is at least 25% lower than the lowest publish fare for that day and sets the floor price at $130
2. $1^{st}$ Round: since all bids are above the Maximum Price offered by the buyer, all $1^{st}$ Round bids are disregarded
3. $2^{nd}$ Round: since both Seller A and Seller C bid equal to the floor, the 3 Round is examined to determine the winner.
4. In the $3^{rd}$ Round, Seller A bid the floor, which is defined to be less than $5 less, so Seller A is awarded the listing.

Example #5

Three Bidders Where One Loses Because of the Rule That a Specific Bid is Considered Lower Than $5 Less Maximum Price Listing of $150

|          | Floor | $1^{st}$ Round | $2^{nd}$ Round | $3^{rd}$ Round |
|----------|-------|----------------|----------------|----------------|
| Seller A | $100  | $150           | $130           | $5 less        |
| Seller B | $130  | $150           | $125           | Floor          |
| Seller C | $125  | $150           | $130           | $125           |

Process:
1. The system determines that floor price is at least 25% lower than the lowest published fare for that day and sets the floor price at $130
2. $1^{st}$ Round: since all bids are identical, the $2^{nd}$ Round is examined, and Seller B is the winner of this round and uses up one of its two available bids bidding $150.
3. $2^{nd}$ Round: since Seller B is the lowest bidder, it is the winner of this round and uses up the second of its two available bids, bidding $125, but the amount is counted as $130 since that is the floor.
4. In the $3^{rd}$ Round, Seller B is not counted (even though it was the lowest bidder since the floor is defined as the lowest bid) because it had already used up its two bids.
5. Seller A's $5 less bed is converted to $125, which is $5 less than the last round winner. Seller C's bid is also $125. In this case the system will consider the specific amount of $125 to be lower than the $5 lower amount, as determined by the rules, and award the listing to Seller C.

Example #6

Three Bidders Where the Date/Time Stamp is Examined to Determine the Winner

Maximum Price Listing of $150

|          | Floor | $1^{st}$ Round | $2^{nd}$ Round | $3^{rd}$ Round |
|----------|-------|----------------|----------------|----------------|
| Seller A | $100  | $200           | $130           | Floor          |
| Seller B | $130  | $190           | $125           | Floor          |
| Seller C | $125  | $185           | $130           | Floor          |

Process:
1. The system determines that floor price is at least 25% lower than the lowest published fare for that day and sets the floor price at $130
2. $1^{st}$ Round: since all bids are above the Maximum Price offered by the buyer, all $1^{st}$ Round bids are disregarded
3. $2^{nd}$ Round: since both Seller A and Seller C bid equal to the floor, and since the floor is considered to be lower than any specific amount, the bids of Sellers A and C in the $3^{rd}$ Round are examined to determine the winner.
4. In the $3^{rd}$ Round all sellers bid the floor, so the system uses tie breaking rules to award the sale as between Sellers A and C. In this example, the date/time stamp of the bids in the system is used to determine the winner. Since Seller A's bid has an earlier date and time, Seller A is awarded the listing at the floor price of $130.

Example #7

Three bidders where the seller's published prices are examined to redefine the floor price. In this case it is a very competitive route where all the sellers are bidding the floor price.
Maximum Price Listing of $150

|  | Floor | 1st Round | 2nd Round | 3rd Round |
| --- | --- | --- | --- | --- |
| Seller A | $150 | Floor | Floor | Floor |
| Seller B | $150 | Floor | Floor | Floor |
| Seller C | $155 | Floor | Floor | Floor |

Process:
1. The system determines that floor price is NOT at least 25% lower than the lowest published fare for that day and resets the floor price at $140
2. Since all bids are identical, the system uses tie breaking rules to determine the winner. In this example, the system randomly assigns the sale to Seller C.

Although the invention has been described in detail in the foregoing embodiments and examples, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A processor implemented method for establishing a floor price for a bid for an item, comprising:
   registering a plurality of sellers of an item;
   receiving, from each seller, an identification of a floor price and a first round price to be applied to a bid from a customer for the item;
   establishing by the processor a standing floor price based on an identification of a highest floor price from among the plurality of sellers, wherein the floor prices of the plurality of sellers are stored in memory;
   awarding a sale of the item at the standing floor price to the seller that submitted said one of the first round prices when one of the first round prices is not greater than the standing floor price; and
   determining a lowest first round bidder based on the received first round prices when none of the first round prices is not greater than the standing floor price.

2. The method of claim 1, wherein the item comprises an airline ticket.

3. The method of claim 1, wherein the plurality of sellers include at least one airline transportation provider.

4. A non-transitory computer-readable medium encoded with processing instructions for causing a processor to implement a method for establishing a floor price for a bid for an item, the method comprising:
   registering a plurality of sellers of an item;
   receiving, from each seller, an identification of a floor price and a first round price to be applied to a bid from a customer for the item;
   establishing by the processor a standing floor price based on an identification of the highest floor price from among the plurality of sellers;
   awarding a sale of the item at the standing floor price to the seller that submitted said one of the first round prices when one of the first round prices is not greater than the standing floor price; and
   determining a lowest first round bidder based on the received first round prices when none of the first round prices is not greater than the standing floor price.

5. An apparatus for establishing a floor price for a bid for an item, comprising:
   a processor; and
   a memory in communication with the processor, the memory storing a plurality of processing instructions for directing the processor to:
   register a plurality of sellers of an item;
   receive, from each seller, an identification of a floor price and a first round price to be applied to a bid from a customer for the item; and
   establish by the processor a standing floor price based on an identification of a highest floor price from among the plurality of sellers;
   awarding a sale of the item at the standing floor price to the seller that submitted said one of the first round prices when one of the first round prices is not greater than the standing floor price; and
   determining a lowest first round bidder based on the received first round prices when none of the first round prices is not greater than the standing floor price.

6. A processor implemented method for selling an item, comprising:
   receiving at an intermediary, from a buyer, a listing of an item to be purchased and a purchase price to be paid for the item;
   identifying at least one seller having an item corresponding to the listing;
   receiving at the intermediary from each of the identified sellers a first indication of a proposed floor price for the item, and a second indication of a first round price for the item;
   establishing by the processor a floor price based on highest proposed floor price indications, which is stored in memory;
   awarding a sale of the item at the floor price to the seller that submitted said one of the second indications when one of the second indications is not greater than the floor price; and
   determining a lowest first round bidder based on the received second indications when none of the second indications is not greater than the floor price.

7. The method of claim 6, wherein the item comprises an airline ticket.

8. The method of claim 6, wherein the listing comprises at least one of:
   an origin city, a destination city, a flight number, a date of travel, a scheduled time of travel, a request for non-stop travel, an identification of a preferred provider and an identification of a traveler.

9. The method of claim 6, wherein the at least one seller comprises at least one airline transportation provider.

10. The method of claim 6, further comprising:
    receiving at the intermediary, from a seller, a fee to bid on the item.

11. The method of claim 6, further comprising:
    receiving at the intermediary, from the buyer, a fee for the listing.

12. The method of claim 11, wherein said receiving the fee further comprises:
    receiving the fee upon completion of a sale of the item.

13. The method of claim 6, wherein said receiving the listing further comprises:
    receiving at the intermediary a financial account identifier corresponding to a financial account owned by the buyer from which the payment for the item will be paid.

14. The method of claim 13 wherein the financial account is a credit card account.

15. The method of claim 6, wherein the listing comprises an identification of a seller that will not be acceptable to the buyer.

16. The method of claim 6, further comprising:
awarding a sale of the item to the lowest first round bidder.

17. The method of claim 16, further comprising:
transmitting, to the buyer, a notification of the sale of the item.

18. The method of claim 16, further comprising:
charging the purchase price to the buyer for the sale.

19. The method of claim 16 further comprising:
charging the buyer the lowest first round bid price for the sale.

20. The method of claim 19 further comprising:
charging a fee to one or both of the buyer and/or the seller.

21. The method of claim 6, wherein the listing is rejected if the purchase price is less than the floor prices.

22. The method of claim 21, further comprising:
receiving at the intermediary from the buyer a fee for the listing; and retaining the fee if the listing is rejected.

23. The method of claim 6, wherein the listing is rejected if the purchase price is less than all received second indications.

24. The method of claim 23, further comprising:
receiving at the intermediary from the buyer a fee for the listing; and retaining the fee if the listing is rejected.

25. The method of claim 6, wherein at least two second indications are submitted which are not greater than the floor price, the method further comprising:
awarding the sale, based on a predefined criterion, to a remaining seller that submitted one of the at least two second indications.

26. The method according to claim 6, further comprising:
determining a lowest first round bidder based on the received second indications when none of the second indications is equal to or less than the floor price;
establishing a first round price corresponding to the second indication received from the lowest first round bidder; and
receiving at the intermediary, from at least one of the sellers, a third indication of a second round price for the item.

27. The method of claim 26 further comprising:
awarding a sale of the item at the floor price to the seller that submitted said one of the third indications when none of the second indications is equal to or less than the floor price.

28. The method of claim 26, further comprising:
determining a lowest second round bidder based on the lowest first round bidder and the received third indications if none of the third indications is less than or equal to the floor price.

29. The method of claim 28, further comprising:
awarding a sale of the item to the lowest second round bidder.

30. The method of claim 29, further comprising:
transmitting, to the buyer, a notification of the sale of the item.

31. The method of claim 29, further comprising:
charging the purchase price to the buyer for the sale.

32. The method of claim 29 further comprising:
charging the lowest second round price to the buyer for the sale.

33. The method of claim 32 further comprising:
charging a fee to one or both of the buyer and the seller.

34. The method of claim 26, wherein at least two third indications are submitted which are not greater than the floor price, the method further comprising:
awarding the sale, based on a predefined criterion, to a remaining seller that submitted one of the at least two second indications.

35. The method of claim 34, wherein the predefined criteria corresponds to a market share of the remaining seller for the item.

36. The method of claim 26, further comprising:
when none of the third indications is equal to or less than the floor price:
determining a lowest second round bidder based on the received third indications;
establishing a second round price corresponding to the third indication received from the lowest second round bidder;
receiving at the intermediary, from at least one of the sellers, a fourth indication of a third round price for the item; and
awarding a sale of the item at the floor price to the seller that submitted said one of the fourth indications when one of the fourth indications is not greater than the floor price.

37. The method of claim 36, further comprising:
determining a lowest third round bidder based on the received fourth indications when none of the received fourth indications is equal to or less than the floor price.

38. The method of claim 37, further comprising:
awarding a sale of the item to the lowest third round bidder.

39. The method of claim 38, further comprising:
transmitting, to the buyer, a notification of the sale of the item.

40. The method of claim 38, further comprising:
charging the purchase price to the buyer for the sale.

41. The method of claim 40, further comprising:
retaining a difference between the purchase price and the fourth indication received from the lowest third round bidder.

42. The method of claim 40, further comprising:
providing a payment to the lowest third round bidder for the item, the payment corresponding to the fourth indication received from the lowest third round bidder.

43. The method of claim 38, further comprising:
charging the buyer the fourth indication received from the lowest third round bidder.

44. The method of claim 43, further comprising:
charging a fee to at least one of the buyer and the seller.

45. The method of claim 36, wherein each received fourth indication is accepted only if the second round price is higher.

46. The method of claim 36, wherein at least two fourth indications are submitted which are not greater than the floor price, the method further comprising:
awarding the sale, based on a predefined criterion, to a remaining seller that submitted one of the at least two second indications.

47. The method of claim 46, wherein the predefined criteria corresponds to a market share of the remaining seller for the item.

48. The method of claim 36, further comprising:
when none of the fourth indications is equal to or less than the floor price:
providing a subsequent round of bidding in which further indications of a sale prices are received at the intermediary from each seller other than the lowest bidder in the immediately preceding round of bidding;

determining a lowest subsequent round bidder based on the received further indications; and awarding the sale of the item to one of: a seller submitting a further indication which is not greater than the floor price and the lowest subsequent round bidder.

49. A non-transitory computer readable medium encoded with processing instructions for causing a processor to implement a method for selling an item, the method comprising:

receiving, from a buyer, a listing of an item to be purchased and a purchase price to be paid for the item;

identifying at least one seller having an item corresponding to the listing;

receiving from each of the sellers a first indication of a floor price for the item, and a second indication of a first round price for the item;

establishing by the processor a floor price based on a highest of said first indications; and awarding a sale of the item at the floor price to the seller that submitted said one of the second indications when one of the second indications is not greater than the floor price;

determining a lowest first round bidder based on the received second indications when none of the second indications is not greater than the floor price.

50. An apparatus for selling an item, comprising:

a processor; and a memory in communication with the processor, the memory storing a plurality of processing instructions directing the processor to:

receive, from a buyer, a listing of an item to be purchased and a purchase price to be paid for the item;

identify at least one seller having an item corresponding to the listing;

receive from each of the sellers a first indication of a floor price for the item, and a second indication of a first round price for the item;

establish by the processor a floor price based on a highest of said first indications; and when one of the second indications is not greater than the floor price, awarding a sale of the item at the floor price to the seller that submitted said one of the second indications.

* * * * *